United States Patent
Chu et al.

[19]

[11] Patent Number: 5,978,173
[45] Date of Patent: Nov. 2, 1999

[54] CASSETTE LOAD/UNLOAD DEVICE OF MAGNETIC TAPE MACHINE

[75] Inventors: Chih-Chung Chu, Taoyuan; Chyi-Fwu Chiou; Chun-Hsiu Pan, both of Hsinchu, all of Taiwan

[73] Assignee: Industrial Technology Research Institute

[21] Appl. No.: 08/490,201

[22] Filed: Jun. 14, 1995

[51] Int. Cl.⁶ .......................... G11B 15/675; G11B 15/60
[52] U.S. Cl. .......................................................... 360/96.5
[58] Field of Search .................................. 360/96.5, 96.6; 369/75.2, 77.2

[56] References Cited

U.S. PATENT DOCUMENTS

| | | | |
|---|---|---|---|
| 4,320,424 | 3/1982 | Murayama | 360/96.5 |
| 5,289,333 | 2/1994 | Chiu et al. | 360/96.5 |
| 5,329,411 | 7/1994 | Chiu et al. | 360/96.5 |

*Primary Examiner*—Stuart S. Levy
*Assistant Examiner*—George J. Letscher
*Attorney, Agent, or Firm*—W. Wayne Liauh

[57] ABSTRACT

An improved cassette loading/unloading device for use with magnetic tape machines is disclosed. It contains a connection member, which includes a first stopper portion extending from a drive plate toward a sliding plate; a second stopper portion mounted on a rear side of the first stopper portion; a connection sheet extending from the sliding plate into a space between the first and second stopper portions; a connection pin penetrating through the first, and second stopper portions and the connection sheet along the path of insertion of the cassette into the magnetic tape unit for relative sliding with the connection sheet; and a buffer spring provided on the connection pin between the second stopper portion and the connection sheet for buffering an impact force when the drive plate pushes the sliding plate.

5 Claims, 7 Drawing Sheets

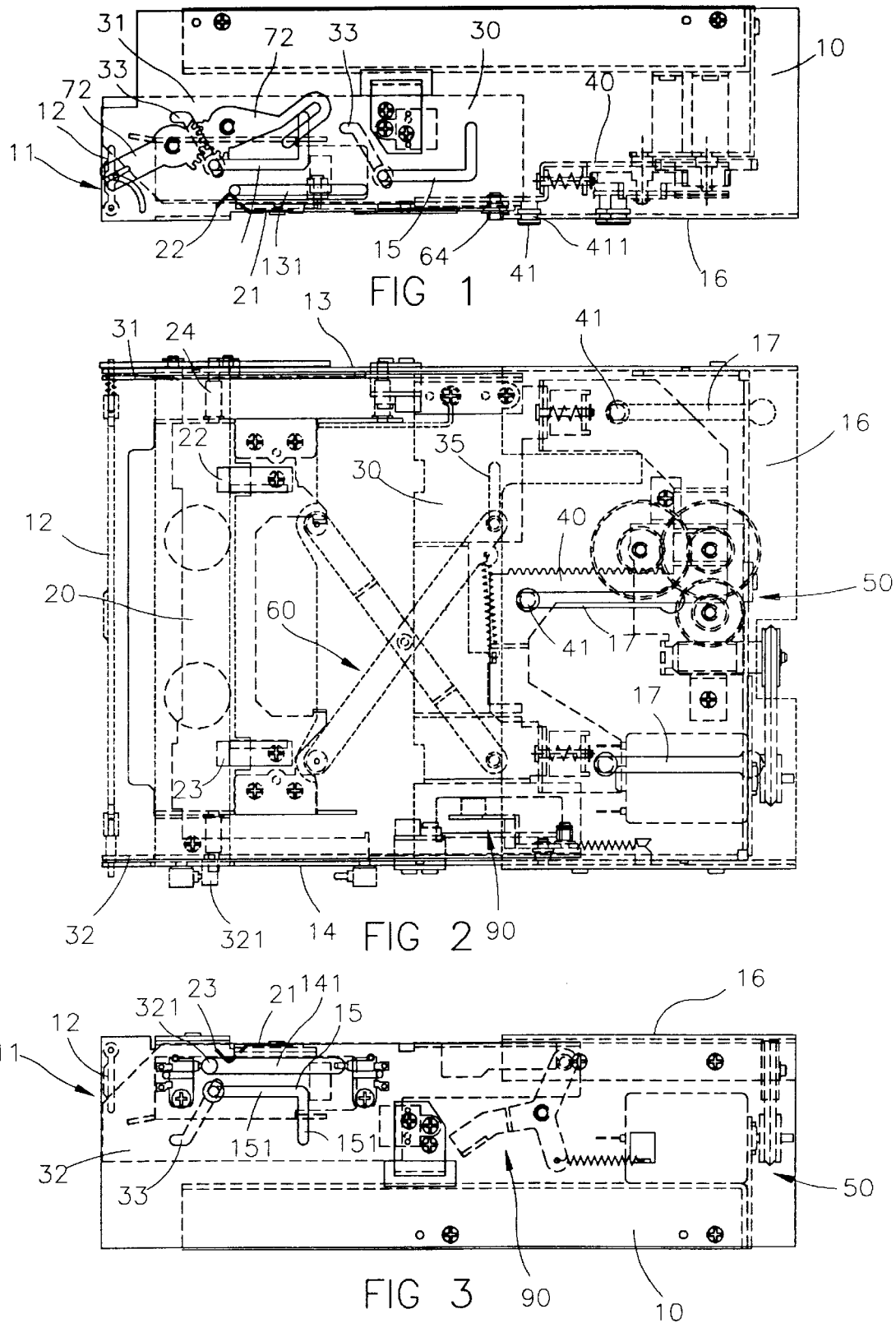

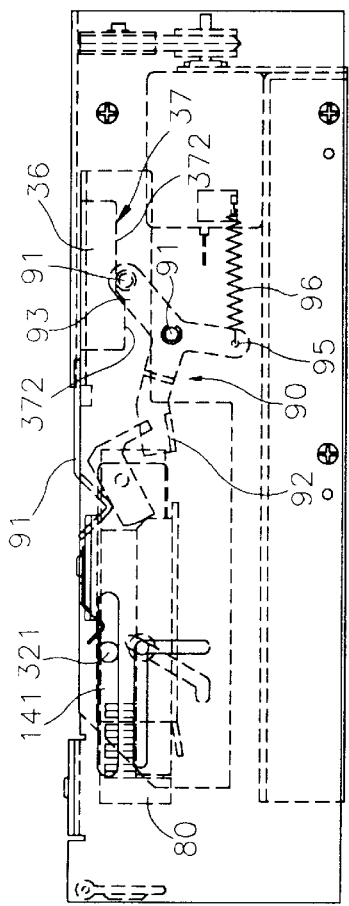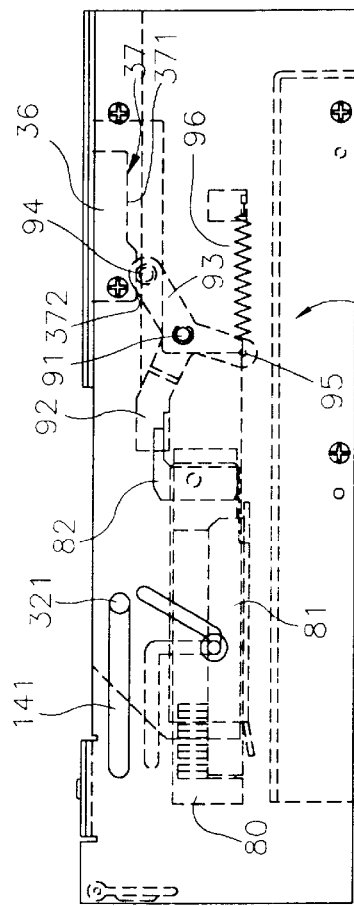

CASSETTE LOAD/UNLOAD DEVICE OF MAGNETIC TAPE MACHINE

BACKGROUND OF THE INVENTION

The present invention relates to a cassette load/unload device, and particularly to the cassette load/unload device of DAT magnetic tape machine for front load.

The conventional cassette load/unload devices most are divided into cam link transmission and gear transmission for driving cassette load/unload device by means of cam link, and normally it may apply force only to one point on the cassette loader while not to distribute force evenly to the each side of the cassette loader so that the movement of cassette loader is not steady to result in high error rate; and gear transmission cassette load/unload device is to accomplish horizontal and vertical movement track by means of special arrangement of gears, and its complicated mechanism has caused large increase of die casting cost; further it should require a larger room for receiving gears not good for downsizing development. For the conventional cassette load/unload device, when the cassette tape is sent into the tape machine through the movable door, the movable door remains movable to cause the user sending another cassette tape or other foreign article into the machine to cause machine failure.

SUMMARY OF THE INVENTION

One object of the present invention is to provide a cassette load/unload device of magnetic tape machine with quick and accurate transmission.

Another object of the present invention is to provide a cassette load/unload device of magnetic tape machine, which is simple for die casting and easy for assembly.

Still another object of the present invention is to provide a cassette load/unload device of magnetic tape machine with small size which is good for downsizing development.

BRIEF DESCRIPTION OF THE DRAWINGS

FIG. 1 is a left-side view of the present invention.

FIG. 2 is a top view of the present invention.

FIG. 3 is a right-side view of the present invention.

FIGS. 12 and 13 are diagramatic views showing continuous movement of Open/Close of the cassette holder.

DETAILED DESCRIPTION OF PREFERRED EMBODIMENTS

Figure 4:
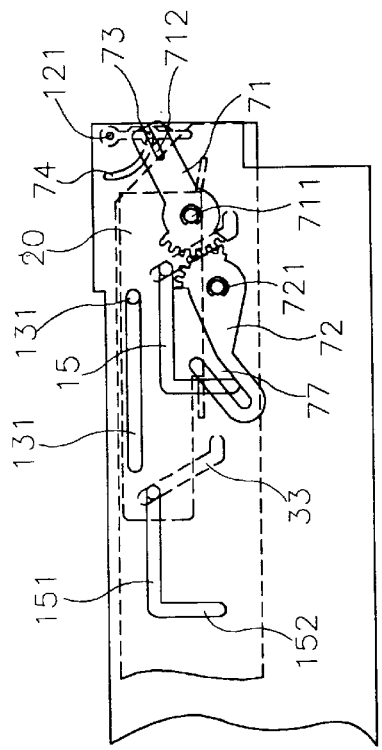
FIGS. 4 thru 7 are a series of diagramatic views showing the movement of the loader, sliding seat and L guide of the present invention and the Open/Close of the movable door.

The present cassette load/unload device of magnetic tape machine relates to a cassette load/unload device for front insertion. Referring to FIGS. 1 thru 3, it comprises a magnetic tape unit 10 having the present cassette load/unload device, on the front of said unit 10 having an insertion port 11 for the insertion of a cassette tape 80 into said unit 10. Said insertion port 11 further having a movable door 12 that can be pushed open when said cassette tape 80 is inserted in said insertion port 11, and said movable door 12 will be returned to close when the cassette tape 80 has been fully inserted in said unit, so as to close said insertion port 11 to prevent foreign article from entry of said unit 10.

Figure 7:
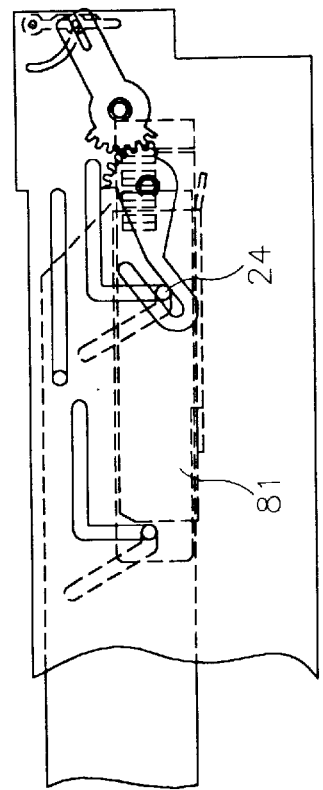

The present cassette load/unload device has a cassette loader 20 for the insertion of said cassette tape 80 therein. Referring to FIGS. 4 and 7, said loader 20 is provided for receiving said cassette, and on the top plate 21 has two cassette holding devices 22, 23 which are reeds projecting over said loader 20 for holding said cassette tape within said loader 20.

On side walls 13, 14 of said unit 10 have a proper number of L guides 15, and on each side wall of said loader 20 has a proper number of guide pins 24 extending outwardly into said L guides 15 for sliding in said guides 15 so that said loader 20 can be limited by said L guides 15 for movably mounted within said unit 10 along the route of said guides 15. Said L guides 15 have a horizontal portion 151 parallel to the insertion of said cassette tape, and a vertical portion 152 is vertical to said horizontal portion 151 and extending toward the bottom of said unit 10 so that when said cassette tape 80 is inserted withhin said loader 20 in position, said loader 20 may drive said cassette tape 80 moving at some distance horizontally to the insertion of said unit 10, then vertically moving down at some distance so that said cassette tape 80 may reach a working position 81 to allow said magnetic tape machine for carrying out PLAY, FORWARD, REVERSE, etc.

Said loader 20 has a horizontally reciprocal sliding seat 30 for driving guide pin 24 on said loader 20 for sliding along said L guides 15. Referring to FIGS. 1 and 2, each side of said sliding seat 30 has a left plate 31/right plate 31 extending between left/right walls of said loader 20 and left/right walls of the unit 10. On left and right walls 13, 14 of said unit 10 have horizontal guides 131, 141 respectively, and left/right plates 31, 32 of said sliding seat has guide pins 311, 321 extending outwardly into said horizontal guides 131, 131 so that said slide seat 30 can be led to horizontally reciprocating in stable manner.

Said left and right plates 311, 321 further have a proper number of cam slots 33 for said guide pins 24 slidably mounted therein, on top end of each cam slots 33 is equal to the height of horizontal portion 151 of L guide 15, and bottom end is roughly equal to the height of vertical portion 152 of L guide 15 and inclining toward the front of said unit 10.

Figure 5:
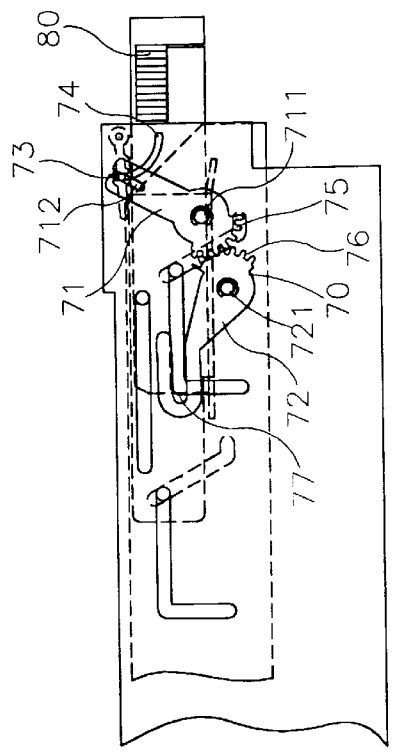
Figure 6:
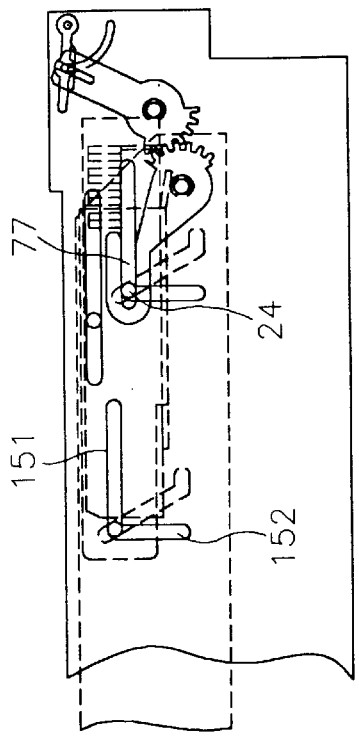

Referring to FIG. 4, when said sliding plate stays at the utmost front position, the top end of each cam slot 33 on said right and left plates 31, 32 is located at the position for each said guide pin 24 to stay when said loader 20 is located at the start position. Referring to FIG. 5, when said sliding plate 30 starts moving backward, said guide pins 24 will be driven by said cam slots 33 whereby said loader 20 will move accordingly however it may move horizontally because of limited by horizontal portion 151 of L guides 15. Referring to FIG. 6, when each guide pin 24 has moved to the distal end of horizontal portion 151, said sliding plate 30 will continue to retreat, because said cam slots 33 have an inclined angle whereby they may produce a downward division of force to drive said guide pins 24 sliding toward the vertical portion 152 of said L guides 15 (FIG. 7) whereby said loader 20 and cassette tape 80 will be driven to the position for the completion of LOAD. When said magnetic tape machine has ejected the cassette tape, said sliding plate 30 moves forward to drive said loader 20 and cassette tape 80 returning to the start position.

Figure 10:
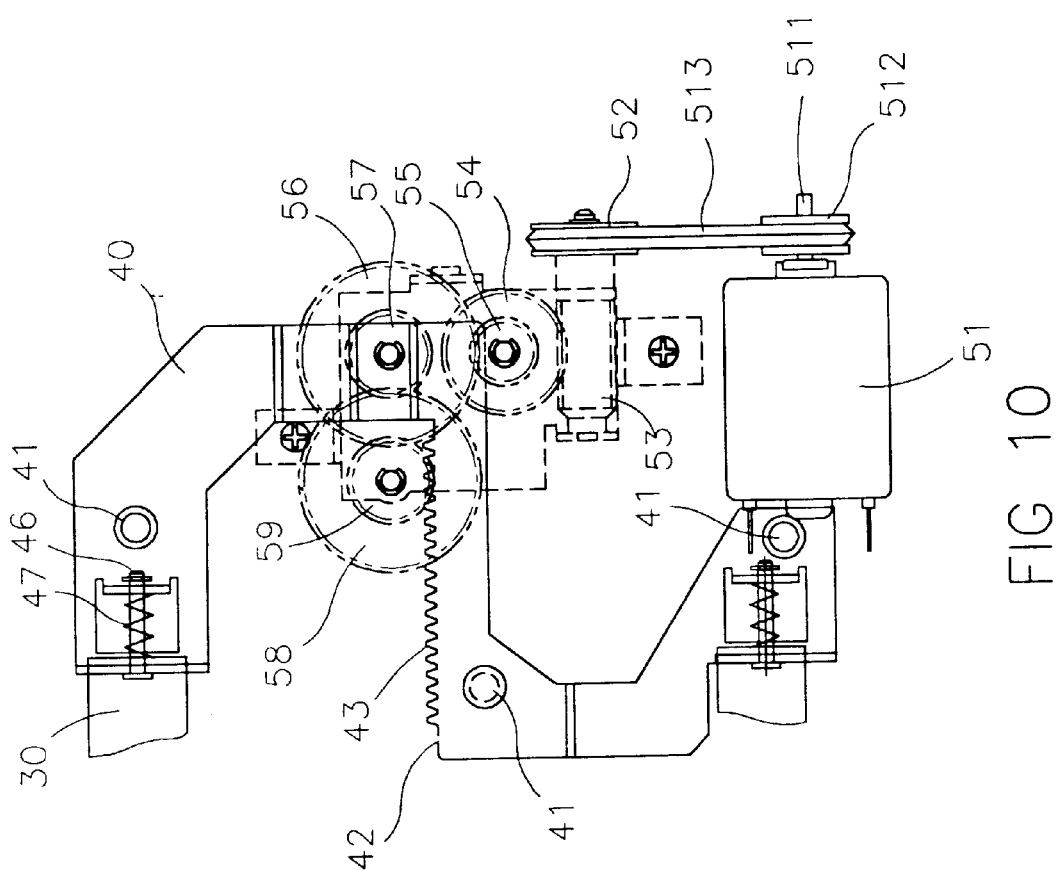
FIG. 10 is a top view showing the structure of the sliding seat and driving plate of the present invention.

Said sliding plate 30 is driven by a drive device 50 and drive plate 40 for producing horizontally reciprocating movement. Referring to FIG. 10, the drive device 50 comprises a reversible motor 51, on the spindle 511 of the motor having a belt wheel 512, said belt wheel 512 has a belt 513 for driving a belt wheel 52, then said belt wheel 52 will drive a worm 53, said worm 53 will drive a worm wheel 54, and said worm wheel 54 will drive a series of gears 55, 56, 57, 58, 59, then said gear 59 will drive said drive plate 40 and sliding plate 30.

Figure 8:
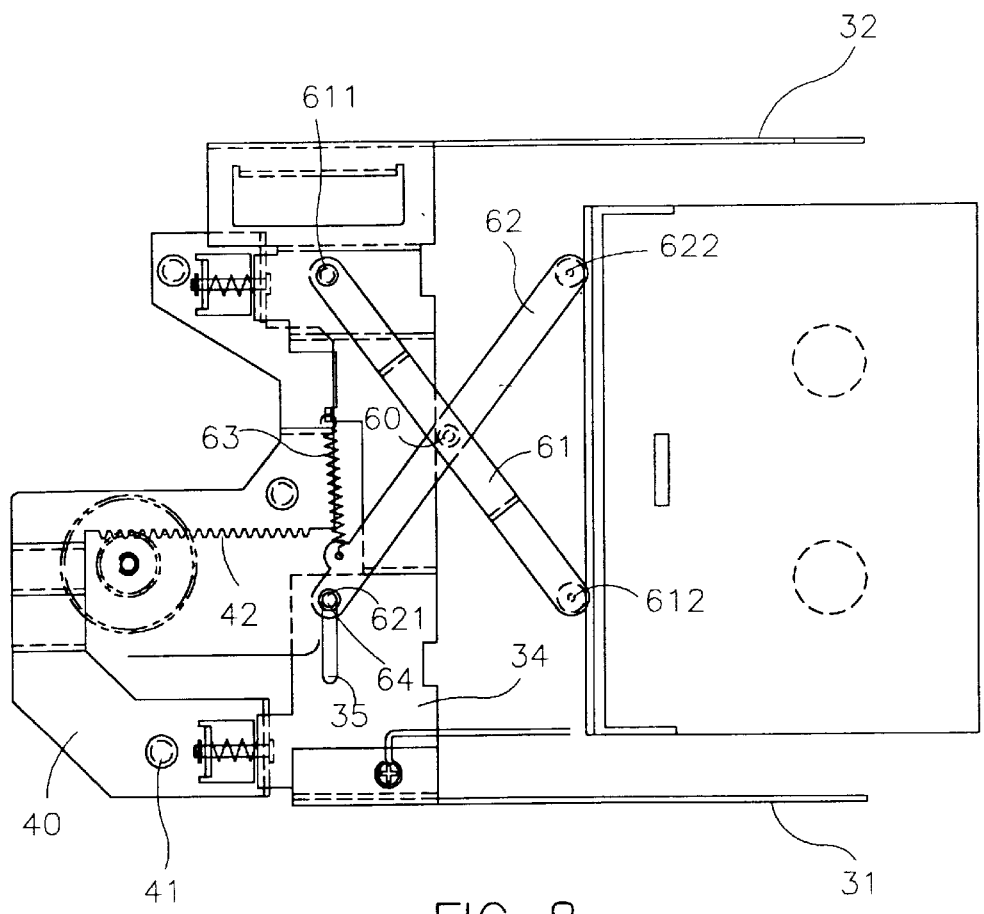
FIG. 8 is a top view showing the structure of the sliding seat, driving plate and link device of the present invention.

Referring to FIGS. 1, 2 and 8, said drive plate 40 is connected between said sliding plate 30 and drive device 50, the top plate of said unit 10 has a proper number of longitudinal guides 17 parallel to the insertion of said cassette tape 80 into said unit 10, and on top of said drive plate 40 has a proper number of guide pins 41 corresponding to the position of each longitudinal guide, on the distal end of each guide pin 41 is extending into each guide 18, and on the perimeter has circular slot 411 for engaging with slot rim of each guide 17 whereby said drive plate 40 is limited for reciprocating movement parallel to said top plate 16.

Referring to FIG. 10, said drive plate 40 has a sideway 42 parallel to the insertion of said cassette tape 80 into the unit and adjoining the gear 59 of said drive device 50. Said sideway 42 has a rack 43 engaging with said gear 59, and said gear 59 is fixedly mounted on said unit 10 so that it may drive said rack 43 for reciprocating movement when in rotation to cause said drive plate 40 moving.

Figure 9:
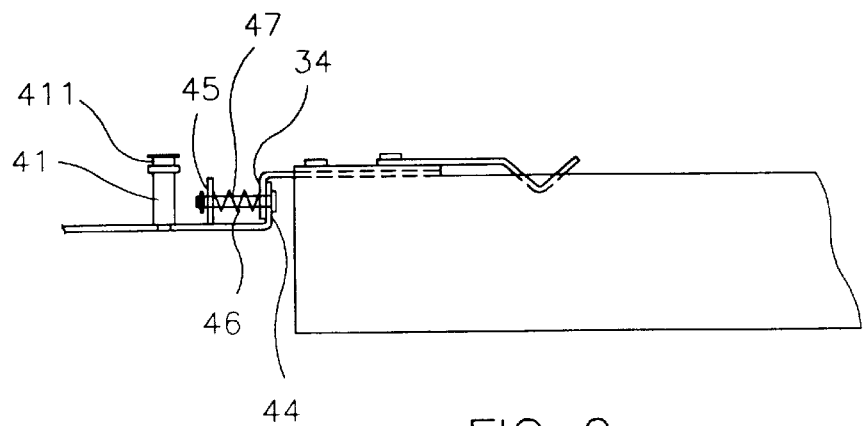
FIG. 9 is a side view showing the connection structure of the sliding seat and driving plate of the present invention.

Referring to FIGS. 8 and 9, each side on the front end of said drive plate 40 is bending upward with a first and second stopper portions 44, 45, said first and second stopper portions 44, 45 are mounted on said drive plate 40 at an interval each other, and on each side on the rear end of said sliding plate 30 has a connection sheet 34 extending downward between said first and second stopper portions 44, 45, and two connection pins 46 penetrate through said first and second stopper portions 44, 45 and said connection sheet 34 along the insertion of said cassette tape into said unit 10 to enable said first and second stopper portions 44, 45 connecting together with connection sheet 34.

Said two connection pins 46 can be sliding relatively to said two connection sheets 34, and have a spring 47 between with said second stopper portion 45 and two connection sheets 34 for upholding said connection sheets 34 to keep pushing tightly against said first stopper portion 44.

When said drive plate 40 is driven by said drive device 50 for moving backward, said first stopper portion 44 may hook up said connection sheet 34 while drive said sliding plate 30 moving backward. When said drive plate 40 is driven for moving forward, said drive plate 40 may push against spring 47 with said second stopper portion and push said connection sheet 34 with the spring 47 and further push said sliding plate 30.

The present invention has used such method for connection of said drive plate 40 with sliding plate 30 to enable said drive plate 40 to drive said sliding plate 30 steadily. When said magnetic tape machine is to eject the tape, the guide pin 24 of said loader is located at the vertical portion 151 of said L guides 15 whereby when the cam slot 33 of said sliding plate 30 has pushed said guide pins 24, it will produce horizontally violent impact, however because of the spring 47 mounted between the second stopper portion of said drive plate 40 and sliding plate 30 it may absorb such impact force to enable the motion to be smooth and to avoid damage to mechanical parts.

Figure 11:
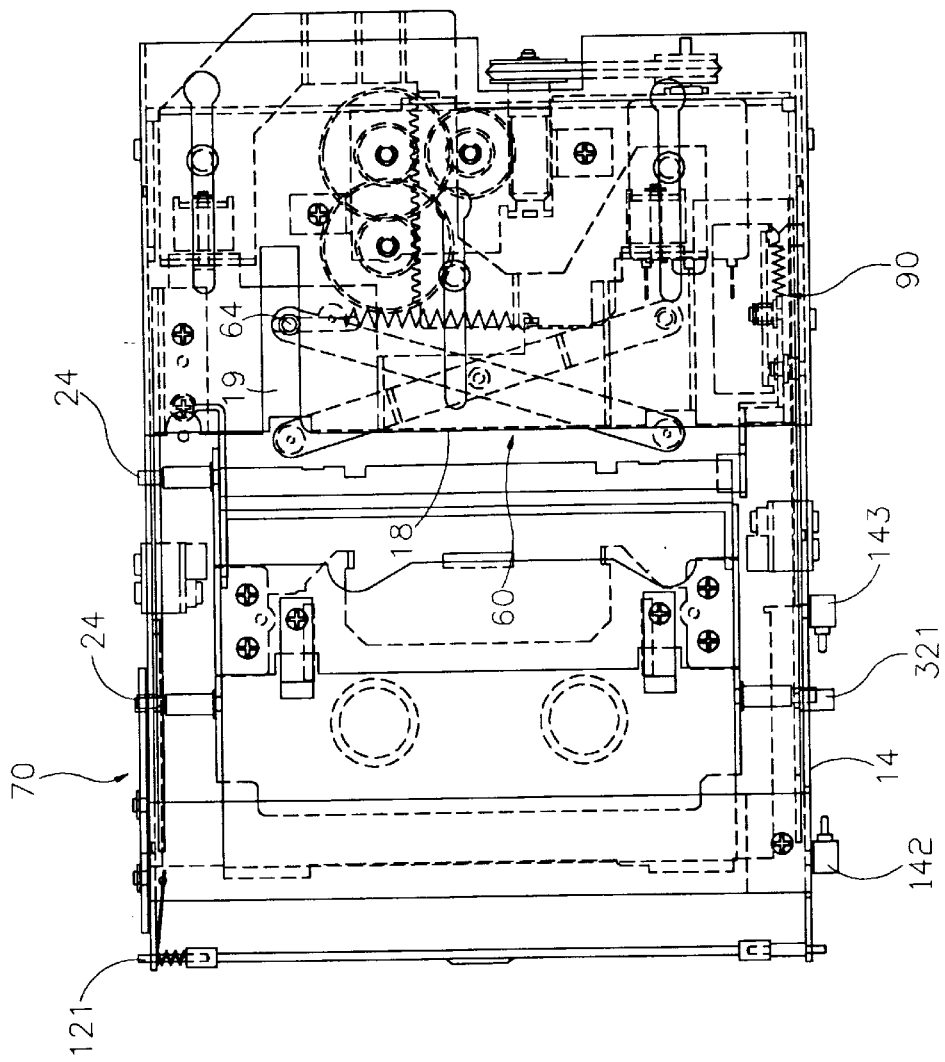
FIG. 11 is a top view showing the location of each component of the cassette loader when the cassette tape has been inserted in the machine.

Referring to FIGS. 8 and 11, on the top plate 34 of said sliding plate 30 has a link device 60, the action of said link device 60 is provided for the ejection of cassette tape out of unit 10 when said magnetic tape machine is to eject cassette tape, and said link device 60 may further match a front edge 18 on said unit top plate 16 and longitudinal slot 19 to control the motion of said loader 20, sliding plate 30 and drive plate 40.

Referring to FIG. 8, said link device 60 has a first link 61 and second link 62, the first end 611 of said first link 61 is fixedly pivotted on said top plate 34, and second end is obliquely extending to the front of said top plate 34 to contact said cassette tape 80. The second link 62 is equal to the length of said first link 61, and intermittently pivotted with said first link 61 on respective sides symmetrically. The first end 621 of said second link 62 is slidably pivotted in horizontal slideway 35 on the same level as the first end of said first link 61 on said top plate 34, and second end 622 is extending to the front of said top plate 34 and align with the horizontal position of the second end 612 of said first link 61.

The direction of said horizontal slideway 35 is vertical to the movement of said sliding plate 30 so that the distance between the first end 621 of said second link 62 and the first end 611 of said first link 61 is changing vertical to the insertion of saaid cassette tape 80 into unit 10. A spring 63 is connected between the first end 621 of said second link 62 and said top plate 34 for keeping said first end 621 at the utmost inner position of said horizontal slideway 35.

Referring to FIG. 8, when the cassette tape 80 is inserted in the loader 20, the second ends 612, 622 of said first and second links 61, 62 will be pushed backward, when said first and second ends move backward, said link device 60 will become extended enabling the first end 621 of said second link 62 to slide outward along said horizontal slideway 35 and enabling said spring 63 to be tensiled.

Referring to FIGS. 8 and 11, on the first end 621 of said second link 62 has a rolling pin 64, said rolling pin 64 is extending from the top of said first end 621 and projecting over the top of top plate 16 of said unit 10. The front edge 18 of said top plate 16 is vertical to the insertion of cassette tape 80 into said unit 10, and its position may match said rolling pin 64 and limit said rolling pin 64 for horizontally sliding without recession when said sliding plate 30 is located at the utmost front position of stroke.

Referring to FIG. 11, said top plate 16 further has a longitudinal slot 19 extending from said front edge 18 to the rear side of said unit 10. The opening of said longitudinal slot 19 is align with the position near the external end of said horizontal slideway 35 whereby when the first end of said second link 62 moves close to the external end of said horizontal slideway 35, said rolling pin 64 may enter from the opening of said longitudinal slot 19 whereby said rolling pin 64 may be free from limit of front edge 18 so that said link device 60 and sliding plate 30 may move toward the rear side of said unit 10.

With limit function of said front edge 18 when cassette tape 80 is inserted in loader 20 to force the front end of said link device 60, said link device 60 and sliding plate 30 will be limited not to retreat so that said link device 60 will be forced to extend and the first end 621 of said second link 62 will slide externally along with said horizontal slideway 35. When said cassette tape 80 is inserted in the loader 20 said rolling pin 64 will slide to the opening of said longitudinal slot 19 so that said sliding plate 30 will be pushed by cassette tape 80 to move backward a little.

Referring to FIG. 11, on the front and rear sides of horizontal guide 141 on the right side wall of unit 10 has a first limit switch 142 and a second limit switch 143, said first and second limit switches 142, 143 may match the guide pin 321 received in said horizontal guide 141, when said guide pin 321 moves backward and disengages with said first limit switch 142, said first limit switch 142 may control said drive device 50 to start while lead drive plate 40 and sliding plate 30 to move backward. Therefore, when said cassette tape 80 is pressed into the loader 20 to force rolling pin of said link device 60 enter said longitudinal slot 19 and said sliding plate 30 move backward a little, sad guide pin 321 will disengage with said limiit switch 142 to enable said drive device 50 to start running and driving said loader 20 and cassette tape 80 to reach said working position 81.

When said loader 20 leads cassette tape 80 to reach said working position 81, said guide pin 321 also moves to the distal end of said horizontal guide 141 to push down said second limit switch 143. Said second limit switch 143 may thus control said drive device 50 to stop running. When said magnetic tape machine desires to eject the tape, reversible motor 51 of said drive device 50 may run in negative way and lead sliding plate 30 of said loader 20 and drive plate 40 moving forward to return to the start position. When said sliding plate 30 moves close to the start position and said rolling pin 64 is caused to disengage with said longitudinal slot to exceed the front edge 18 of said base plate 16, said spring 63 may release resilience to lead the first end 621 of said second link 62 to slide swiftly toward the start end of said horizontal slideway 35 to enable said link device 60 to shrink up while causes its front end moving forward swiftly so that said cassette tape 80 will be ejected out of the unit 10.

Said movable door 12 can be lifted up when said cassette tape 80 is inserted in and ejected out of said unit 10 to enable the cassette tape 80 to enter/depart from said insertion port 11 smoothly. Referring to FIG. 4, said movable door 12 is pivotted on said insertion port 11 by means of a latch 121, said latch 121 is located on top of said insertion port 11, and normally said movable door 12 is shut off. When said cassette tape 80 is inserted from said insertion port 11, said movable door 12 can be pushed open toward said unit 10 to enable said cassette tape 80 to be inserted in said unit 10 (FIG. 5).

On the left wall 13 of unit 10 has an OPEN/CLOSE device of movable door 70, including a first rocking arm 71, and second rocking arm 72. On said movable door 12 at some distance from said latch 121 has an externally horizontal push lever 73, on side wall of said unit 10 has an arch slot 74 for said push lever 73 moving therein so that said push lever may be rocking ith said movable door 12. Said first rocking arm 71 is pivotted on the side wall 13 of said unit 10 by means of latch 711, and front end has a U slideway 712 for slidably engaging with said push lever 73 whereby when said movable door 12 is pushed open said push lever 73 may push said first rocking arm 71 for swinging upward along said latch 711. Said second rocking arm 71 has an arch tooth 75 centering around--said latch 711, and said second rocking arm 72 has an arch tooth 76 engaging with said arch tooth 75 for centering around said latch 721 so that when said first rocking arm 71 is pushed by the push lever 73, the distal end of said second rocking arm 72 will be swinging upward accordingly (FIG. 5).

On the distal end of said second rocking arm 72 has a retaining slot 77, and the location of said second rocking arm 72 is to match either of L guides 15 whereby when said second rocking arm 72 is driven by said first rocking arm 71 swinging up to the utmost top end, the opening of said retaining slot 77 is fitted to the horizontal portion 151 of said L guide 15, enabling said guide pin 24 moving horizontally into said retaining slot 77 (FIG. 6), and when said guide pin 24 moves down along said vertical portion 152, the distal end of said second rocking arm 72 will swing down (FIG. 7). When said guide pin 24 has reached the utmost bottom end of said vertical portion 152, said second rocking arm 72 will be driven back to the start state when the cassette tape 80 not yet inserted in said unit 10 as shown on FIG. 4 whereby when said loader 20 drives the cassette tape to the working position 81, said second rocking arm 72 will drive said first rocking arm 71 to force said movable door 12 back to CLOSE (FIG. 7) to cause it not to OPEN.

When said magnetic tape machine desires to EJECT tape, guide pin of said loader 20 will be rising up to the utmost top end of said vertical portion 152 and said guide pin 24 may drive said first and second rocking arms 71, 72 whereby said movable door 12 will become OPEN for said cassette tape 80 to retreat from the unit 10.

Said unit 10 also incorporates a push-open mechanism 90, when the cassette tape 80 has reached its working position 81, the holder on said cassette tape 80 may become OPEN so that megnetic head of said magnetic tape machine may contact the tape within said cassette 80.

Referring to FIGS. 12 and 13, said push-open mechanism 90 is pivotted on the side wall of said unit 10 by means of a lash 91, and on the front end has a push lever 92, and on the rear end has a rocking arm 93, on the distal end of said rocking arm 93 has a roller 94. On the bottom end of top plate 34 of said sliding plate 30 has a cam plate 36, said cam plate 36 has a contact side 37 matching said roller 94, said contact side 37 has two sectiions 371, 372 of different height, referring to FIG. 12, when said cam plate 36 moves toward the rear end of said unit along said sliding plate 30, the first section 371 of said contact side 37 may drive the push lever 92 of said push-open mechanism 90 swinging upward at some distance whereby when said cassette 80 retreats, said cassette holder 82 may move to the top of said push lever 92, referring to FIG. 13, it may continue to move backward following said sliding plate 30 till the second section 372 of said cam plate 36 to contact said roller 94 so as to drive the push lever 92 of said push-open mechanism 90 to open said cassette holder partially, then relative displacement of said cassette 80 vertically moving down to said working position 81 with said push lever 92 may cause said cassette holder 82 opening in full. Said push-open mechanism 90 further has a connection rod 95, and a spring 96 is connected between said connection rod 95 and said unit 10 for keeping roller 94 of said rocking arm 93 tightly hold on to said cam plate 36.

The present invention has following advantages compared to the conventional cassette load/unload device:

(1) The present invention uses cam slot 33 on linear-motion sliding plate 30 to match L guides on the side wall of unit for driving loader 20 to lead the cassette for LOAD/UNLOAD, and uses link device 60 to eject the cassette 80 out of the unit 10, such drive structure may drive loader 20 steadily and smoothly and has a simple structure to save the space.

(2) The present invention uses cam slot and link as the motion control mechanism so that the mechanism is simple with actual motion and easy for assembly.

(3) The cassette holder of the present invention has two-stage open so that the push-open mechanism is simplified with smaller range of motion to become advantageous for downsizing the whole unit.

(4) The OPEN/CLOSE device 70 of movable door of the present invention may control said movable door 12 to get Close when said cassette 80 has reached the working position 81 so that it may prevent from intrusion of any foreign article into the unit during the operation of cassette tape.

We claim:

1. A cassette load/unload device for loading and unloading a cassette in a magnetic tape unit, said magnetic tape unit having an opening for said cassette to be inserted horizontally therein; and said load/unload device including:

a loader which is structured to receive the cassette and move horizontally and vertically in said magnetic tape unit along an L-shaped route;

a plurality of L-shaped guides having a horizontal portion and a vertical portion for leading said loader to move along said L-shaped route, said L-shaped guides being mounted on side walls of said magnetic tape unit;

a plurality of guide pins provided on said loader which are slidably retained in said L-shaped guides, enabling said loader to be led by said L-shaped guides;

a sliding plate reciprocally and movably mounted in said magnetic tape unit along a path of insertion of said cassette into said magnetic tape unit, each side of said sliding plate having an extension plate extending forward to each side of said loader and a top plate;

a plurality of cam slots mounted on said extension plates for driving said guide pins to move reciprocally along said L-shaped guides when said sliding plate moving reciprocally, thus enabling said loader to reciprocally move along said L-shaped route;

a link device mounted on said top plate of said sliding plate which includes:

a first link having a first end fixedly pivoted on said top plate of said sliding plate, and a second end obliquely extending to a front portion of said top plate which is pushed down by the cassette when the cassette inserted in said loader;

a second link equal in length to said first link and intermittently pivoted with said first link, said second link having a first end slidably pivoted on said top plate and a second end located at the same level as the first end of said first link;

a spring connected between said first end of said second link and said top plate for keeping said first end of said second link in a slideway facing said first end of said first link;

a rolling pin extending from top top of said first end and projecting over a top of said top plate of said magnetic tape unit;

a limit member provided in said top plate for limiting said rolling pin only to slide horizontally without retreat;

a longitudinal slot parallel to the path of insertion of said cassette into the unit, enabling said first end of said second link to slide along said slideway for a distance so as to allow said rolling pin to enter said slideway while enabling said rolling pin and said sliding plate to slide to a rear side of said magnetic tape unit along said longitudinal slot;

a drive plate reciprocally and slidably mounted in said magnetic tape unit parallel to the path of insertion of said cassette tape into the unit, said drive plate being connected with said sliding plate by means of two connection members on each side of said sliding plate and said drive plate; said two connection members allowing for relative sliding between said drive plate and said sliding plate along the path of insertion of the cassette into said magnetic tape unit;

a drive device for driving said drive plate to move forward and backward along the path of insertion of the cassette into said magnetic tape unit;

a first limit switch to push said link device so as to cause said rolling pin to enter said longitudinal guide when the cassette is inserted into said magnetic tape unit, enabling said cassette loader and said sliding plate to move backward a small distance to start said drive device for driving said drive plate to move backward; and a second limit switch to control said drive device to stop running when the cassette reaches a working position;

further wherein said connection member includes: a first stopper portion extending from said drive plate toward said sliding plate; a second stopper portion mounted on a rear side of said first stopper portion; a connection sheet extending from said sliding plate into a space between said first and second stopper portions; a connection pin penetrating through said first, and second stopper portions and said connection sheet along the path of insertion of the cassette into said magnetic tape unit for relative sliding with said connection sheet; and a buffer spring provided on said connection pin between said second stopper portion and said connection sheet for buffering an impact force when said drive plate pushes said sliding plate;

whereby when an operator inserts the cassette into said magnetic tape unit from a front side thereof, said link device is forced to cause said spring to accumulate a spring force, and the cassette is driven to said working position by means of said drive plate, said sliding plate and said loader; when said cassette is ejected out of said magnetic tape unit, said rolling pin of said link device is disengaged from said longitudinal slot and said spring is allowd to release its spring force, causing said link device to eject said cassette out of said magnetic tape unit.

2. The cassette load/unload device as claimed in claim 1 which contains a cassette holder open device, and said cassette holder open device includes:

a cam mounted on said sliding plate for linear reciprocating movements following said sliding plate;

an open mechanism rotably pivotted on said magnetic tape unit by means of a lash and driven by said cam for moving around said lash; said open mechanism having a push lever for pushing a cassette holder to open;

whereby when said sliding plate moves toward a rear end of said magnetic tape unit, said cam drives said open mechanism in a direction to cause said push lever to swing so as to cause said cassette holder to partially open, then said vertical portion of said L-shaped guides moves downward along said L-shaped route to said working position to cause a relative displacement between said cassette holder and said push lever, while causing said cassette holder to fully open.

3. The cassette load/unload device as claimed in claim 1 which contains a movable door and a door open/close device said door open/close device includes:

a first rocking arm rotatably pivoted on a side wall of said magnetic tape unit near the front side thereof;

a second rocking arm pivotted on said side wall of said magnetic tape unit;

a plurality of arch racks provided in said first and second rocking arms centering around a lash respectively thereof for engaging said first and second rocking arms such that, when either of said first and second rocking arms swings, the other rocking arm is driven in rotation;

a push lever provided on said movable door near said first rocking arm projecting over a side arm of said magnetic tape unit;

a U-slot provided on a distal end of said first rocking arm for said push lever to reciprocally slide and engage with said first rocking arm such that, when said movable door is lifted up to drive said first rocking arm to swing, said rocking arm drives said movable door to open or close; and an opening provided on said second rocking arm toward a retaining slot in front of said magnetic tape unit such that, when said movable door is lifted open in full, said second rocking arm is driven to cause said retaining slot to swing to a position parallel to said horizontal portion of said L-shaped guide;

whereby when the cassette is inserted in said magnetic tape unit to reach said working position, said first and second rocking arms are driven to close said movable door, and when the cassette is ejected out of said magnetic tape unit, said first and second rocking arms are driven to cause said movable door to open.

4. A cassette load/unload device for loading and unloading a cassette in a magnetic tape unit said magnetic tape unit having an opening for the cassette to be inserted horizontally therein and a cassette holder open device; and said load/unload device including:

a loader which is structured to receive the cassette and move horizontally and vertically in said magnetic tape unit along an L-shaped route;

a plurality of L-shaped guides having a horizontal portion and a vertical portion for leading said loader to move along said L-shaped route, said L-shaped guides being mounted on side walls of said magnetic tape unit;

a plurality of guide pins provided on said loader which are slidably retained in said L-shaped guides, enabling said loader to be led by said L-shaped guides;

a sliding plate reciprocally and movably mounted in said magnetic tape unit along a path of insertion of said cassette in said magnetic tape unit, each side of said sliding plate having an extension plate extending forward to each side of said loader and a top plate;

a plurality of cam slots mounted on said extension plates for driving said guide pins to move reciprocally along said L-shaped guides when said sliding plate moves reciprocally, thus enabling said loader to reciprocally move along said L-shaped route;

a link device mounted on said top plate of said sliding plate which includes:

a first link having a first end fixedly pivoted on said top plate of said sliding plate, and a second end obliquely extending to a front of said top plate which is pushed down by the cassette when the cassette inserted in said loader;

a second link equal in length to said first link and intermittently pivoted with said first link, said second link having a first end slidably pivoted on said top plate and a second end located at the same level as the first end of said first link; and a spring connected between said first end of said second link and said top plate for keeping said first end of said second link in a slideway facing said first end of said first link;

a rolling pin extending from a top of said first end and projecting over a top of said top plate of said magnetic tape unit;

a limit member provided in said top plate for limiting said rolling pin only to slide horizontally without retreat; and a longitudinal slot parallel to the path of insertion of said cassette into the unit, enabling said first end of said second link to slide along said slideway for a distance so as to allow said rolling pin to enter said slideway while enabling said rolling pin and said sliding plate to slide to a rear side of said magnetic tape unit along said longitudinal slot;

a drive plate reciprocally and slidably mounted in said magnetic tape unit parallel to the path of insertion of said cassette tape into the unit, said drive plate being connected with said sliding plate by means of two connection members on each side of said sliding plate and said drive plate, said two connection members allowing for relative sliding between said drive plate and said sliding plate along the path of insertion of the cassette into said magnetic tape unit;

a drive device for driving said drive plate to move forward and backward along the path of insertion of the cassette into said magnetic tape unit;

a first limit switch to push said link device so as to cause said rolling pin to enter said longitudinal guide when the cassette is inserted into said magnetic tape unit, enabling said cassette loader and said sliding plate to move backward a small distance to start said drive device for driving said drive plate to move backward; and a second limit switch to control said drive device to stop running when the cassette reaches a working position;

further wherein said cassette holder open device includes:
a cam mounted on said sliding plate for linear reciprocating movements following said sliding plate; an open mechanism rotatably pivoted on said magnetic tape unit by means of a lash and driven by said cam for moving around said lash, and said open mechanism having a push lever for pushing a cassette holder to open;

whereby when said sliding plate moves toward a rear end of said magnetic tape unit, said cam drives said open mechanism in a direction to cause said push lever to swing so as to cause said cassette holder to partially open said vertical portion of said L-shaped guides moving downward along said L-shaped route to said working position to cause a relative displacement between said cassette holder and said push lever, while causing said cassette holder to fully open.

5. A cassette load/unload device for loading and unloading a cassette in a magnetic tape unit said magnetic tape unit having an opening for said cassette to be inserted horizontally therein, a movable door, and a door open/close device; and said load/unload device including:

a loader which is structured to receive the cassette and move horizontally and vertically in said magnetic tape unit along an L-shaped route;

a plurality of L-shaped guides having a horizontal portion and a vertical portion for leading said loader to move along said L-shaped route, said L-shaped guides being mounted on side walls of said magnetic tape unit;

a plurality of guide pins provided on said loader which are slidably retained in said L-shaped guides, enabling said loader to be led by said L-shaped guides;

a sliding plate reciprocally and movably mounted in said magnetic tape unit along a path of insertion of said cassette in said magnetic tape unit, each side of said sliding plate having an extension plate extending forward to each side of said loader and a top plate;

a plurality of cam slots mounted on said extension plates for driving said guide pins to move reciprocally along said L-shaped guides when said sliding plate moving reciprocally, thus enabling said loader to reciprocally move along said L-shaped route;

a link device mounted on said top plate of said sliding plate which includes:

a first link having a first end fixedly pivoted on said top plate of said sliding plate, and a second end obliquely extending to a front of said top plate which can be pushed down by the cassette when the cassette is inserted in said loader;

a second link equal in length to said first link and intermittently pivoted with said first link, said second link having a first end slidably pivoted on said top plate and a second end located at the same level as the first end of said first link; and a spring connected between said first end of said second link and said top plate for keeping said first end of said second link in a slideway facing said first end of said first link;

a rolling pin extending from a top of said first end and projecting over a top of said top plate of said magnetic tape unit;

a limit member provided in said top plate for limiting said rolling pin only to slide horizontally without retreat; and a longitudinal slot parallel to the path of insertion of said cassette into the unit, enabling said first end of said second link to slide along said slideway for a distance so as to allow said rolling pin to enter said slideway while enabling said rolling pin and said sliding plate to slide to a rear side of said magnetic tape unit along said longitudinal slot;

a drive plate reciprocally and slidably mounted in said magnetic tape unit parallel to the path of insertion of said cassette tape into the unit, said drive plate being connected with said sliding plate by means of two connection members on each side of said sliding plate and said drive plate, said two connection members allowing for relative sliding between said drive plate and said sliding plate along the path of insertion of the cassette into said magnetic tape unit;

a drive device for driving said drive plate to move forward and backward along the path of insertion of the cassette into said magnetic tape unit;

a first limit switch to push said link device so as to cause said rolling pin to enter said longitudinal guide when the cassette is inserted into said magnetic tape unit, enabling said cassette loader and said sliding plate to move backward a small distance to start said drive device for driving said drive plate to move backward; and a second limit switch to control said drive device to stop running when the cassette reaches a working position;

further wherein said door open/close device includes: a first rocking arm rotatably pivoted on a side wall of said magnetic tape unit near the front side thereof; a second rocking arm pivoted on said side wall of said magnetic tape unit; a plurality of arch racks provided in said first and second rocking arms centering around a lash respectively thereof for engaging said first and second rocking arms such that, when either of said first and second rocking arms swings, the other rocking arm is driven in rotation; a push lever provided on said movable door near said first rocking arm projecting over a side arm of said magnetic tape unit; a U-slot provided on a distal end of said first rocking arm for said push lever to reciprocally slide and engage with said first rocking arm such that, when said movable door is lifted up to drive said first rocking arm to swing, said rocking arm drives said movable door to or close; and an opening provided on said second rocking arm toward a retaining slot in front of said magnetic tape unit such that, when said movable door is lifted open in full, said second rocking arm is driven to cause said retaining slot to swing to a position parallel to said horizontal portion of said L-shaped guide;

whereby when the cassette is inserted in said magnetic tape unit to reach said working position, said first and second rocking arms are driven to close said movable door, and when the cassette is ejected out of said magnetic tape unit, said first and second rocking arms are driven to cause said movable door to open.

* * * * *